Sept. 13, 1938.  H. J. SOMERS  2,130,107
FILTER
Filed Feb. 6, 1936
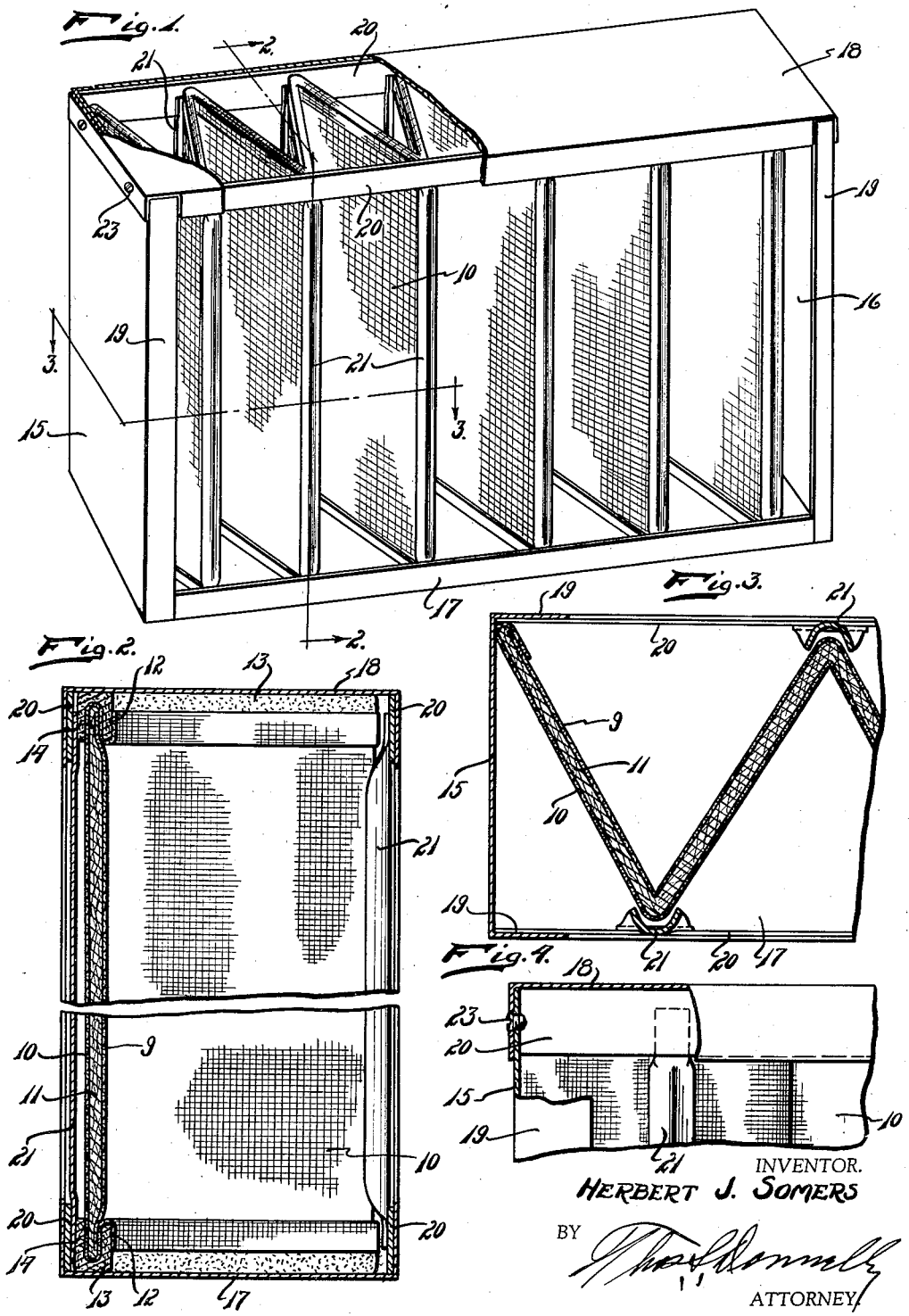
INVENTOR.
HERBERT J. SOMERS
BY
ATTORNEY Patented Sept. 13, 1938

2,130,107

UNITED STATES PATENT OFFICE 2,130,107

FILTER

Herbert J. Somers, Detroit, Mich.

Application February 6, 1936, Serial No. 62,576

1 Claim. (Cl. 183—71)

My invention relates to a new and useful improvement in a filter adapted for use in filtering air and other similar fluids upon the passage of the fluid through the filter element.

It is an object of the present invention to provide a filter embodying a supporting frame having a filter element mounted therein and so inserted that it may be easily and quickly removed therefrom.

Another object of the invention is the provision of a filter of this class which will be simple in structure, economical of manufacture, durable, strong, compact, while at the same time of a minimum weight.

Another object of the invention is the provision in a filter of this class of guide ribs which serve as guides for the filter element when moved into position of the filter frame or structure and which will also serve to protect the filter element while in use.

Another object of the invention is the provision of a filter having a filter element mounted in a supporting body and provided at its opposite ends with sealing means whereby escape of fluid around the ends of the frame is substantially eliminated or at least reduced to a minimum.

Other objects will appear hereinafter.

The invention consists in the combination and arrangement of parts hereinafter described and claimed.

The invention will be best understood by a reference to the accompanying drawing which forms a part of the specification, and in which, Fig. 1 is a perspective view of the invention with a part broken away and a part shown in section.

Fig. 2 is a sectional view taken on line 2—2 of Fig. 1.

Fig. 3 is a fragmentary, sectional view taken on line 3—3 of Fig. 1.

Fig. 4 is a fragmentary side elevational view with a part broken away and shown in section.

The filter element is formed from a pair of spaced foraminous members 9 and 10 between which is positioned a mat or filler 11 preferably formed from spun glass or other suitable filtering medium. These members 9 and 10 may be termed the retaining walls of the filter element while the spun glass forms the filler. The filter element is shaped into sinuous formation to provide the successive V-shaped formations shown in Fig. 3 and Fig. 1. In the form shown in Fig. 1 the filter is indicated as erected in vertical position and the upper edge of the filter element may be termed the top while the opposite edge is termed the bottom. This is merely to distinguish these edges from the end edges of the filter element as it is not an absolute necessity that the filter element when in use be mounted vertically as shown in Fig. 1. Secured along one edge to the top and bottom edges of the filter element by having the end 12 of the layer 10 folded upon itself is a layer 13 of felt or other suitable yieldable material. This layer is folded over as at 14 so that the upper and lower edges of the filter element are covered with this overlying layer of yieldable material which, in the present instance, is felt.

I provide a supporting frame or structure for the filter element comprising end walls 15 and 16, a bottom wall 17 and a removable top wall 18. Each of these walls is provided on its opposite edges with an inwardly-directed flange 19. Secured at their opposite ends to each of the end walls 15 and 16, at opposite sides thereof, and at the top and bottom, are the metallic strips 20. The oppositely positioned metallic strips, that is the metallic strips on the top and bottom of the same side, are connected by the channel guide strips 21 which are secured by welding or in any other suitable manner at their opposite ends to the strips 20. Each of these strips is cut away at its upper and lower ends to facilitate the insertion of the filter element therein and to provide substantially flat terminal portions. The filter element, when inserted in the frame, engages at each of the apices of each V-shaped structure in one of the guide ribs 21. The cover 18 is secured in position, after the insertion of the filter element, by means of the screws 23.

When the filter element is assembled in the frame and the cover 18 mounted in position, a very secure and compact structure is provided and one in which the filter element itself is protected to a maximum degree from injury to being struck by large articles. Moreover, the filter element will be held in a very secure position free from rattling while at the same time the felt strips 13 will engage the bottom 17 and the top 18 and prevent passage of fluids between the top and bottom of the frame of the filter element, thus the fluid will then be forced to pass through the filter so that a filtering of the same will be effected. On this account the device is quite efficient as a filter element in addition to affording the various advantages enumerated.

While I have illustrated and described the preferred form of construction, I do not wish to limit myself to the precise details of structure shown, but wish to avail myself of such modifications and variations as may come within the scope of the appended claim.

Having thus described my invention, what I claim as new and desire to secure by Letters Patent is:

A filter element of the class described comprising: a sinuous body formed from a pair of spaced foraminous members in spaced relation to each other; a filter medium positioned in the space between said members, one of said members being doubled upon the other along the edge and then doubled upon itself and a layer of yieldable material positioned along the edge of said member and clamped by said portion which is doubled upon itself.

HERBERT J. SOMERS.